United States Patent [19]

Oklejas et al.

[11] Patent Number: 4,983,305
[45] Date of Patent: Jan. 8, 1991

[54] POWER RECOVERY PUMP TURBINE

[76] Inventors: Robert A. Oklejas, 774 E. Hurd Rd.; Eli Oklejas, Jr., 1648 W. Lorain, Apt. 202, both of, Monroe, Mich. 48161

[21] Appl. No.: 437,449
[22] Filed: Nov. 15, 1989

Related U.S. Application Data

[62] Division of Ser. No. 315,139, Feb. 24, 1989.

[51] Int. Cl.$^5$ .................... B01D 61/06; B01D 61/18
[52] U.S. Cl. ........................ 210/642; 210/321.66
[58] Field of Search ............... 210/634, 637, 640, 641, 210/642, 644, 649–652, 195.2, 257.2, 258, 321.6, 321.63, 321.64, 321.66, 321.65, 321.72, 416.1; 60/597, 614–616, 620–623, 325, 330, 363

[56] References Cited

U.S. PATENT DOCUMENTS

| | | |
|---|---|---|
| 1,609,306 | 12/1926 | Peterson . |
| 2,710,579 | 6/1955 | Kriegbaum . |
| 2,809,590 | 10/1957 | Brown . |
| 4,029,438 | 6/1977 | Sloan . |
| 4,077,220 | 3/1978 | Matthews . |
| 4,208,166 | 6/1980 | Schroeder et al. . |
| 4,227,865 | 10/1980 | Erickson et al. . |
| 4,230,564 | 10/1980 | Keefer . |
| 4,264,285 | 4/1981 | Erickson et al. . |
| 4,391,102 | 7/1983 | Studhalter et al. . |

Primary Examiner—Frank Sever
Attorney, Agent, or Firm—Emch, Schaffer, Schaub & Porcello Co.

[57] ABSTRACT

The invention is directed to an energy recovery pump turbine for use in industrial processes where a fluid is pumped at a high pressure to the process and at least a portion of the fluid is discharged from the process at a high pressure. A turbine is positioned to receive the high pressure discharge from the process. The turbine has an impeller positioned on a shaft and the discharged fluid engages the impeller and causes the impeller and shaft to rotate. A pump is position adjacent to the turbine to receive the fluid being pumped to the process. The pump has an impeller mounted on a shaft and the shaft of the pump is operatively connected to the shaft of the turbine. Rotation of the turbine shaft causes the impeller and the shaft of the pump to rotate whereby the pump assists in supplying the fluid under pressure to the process and to recover energy from the high pressure fluid discharged from the process. Also disclosed is a method for recovering energy from an industrial process where a fluid is pumped at a high pressure into the process and at least a portion of the fluid is discharged from the process at a high pressure. The high pressure discharged fluid is directed into the inlet of a turbine. The inlet of the turbine is caused to rotate by the high pressure discharged fluid. The turbine impeller is mounted on a rotatable shift. An impeller of a pump that is mounted on the shaft is caused to rotate by the rotation of the shaft that is caused by the rotation of the turbine impeller. The fluid that is to be pumped to the process is directed to the inlet of the pump. The rotating impeller of the pump raises the pressure of the fluid supplied under high pressure to the process and recovers energy from the high pressure fluid discharged from the process.

19 Claims, 8 Drawing Sheets

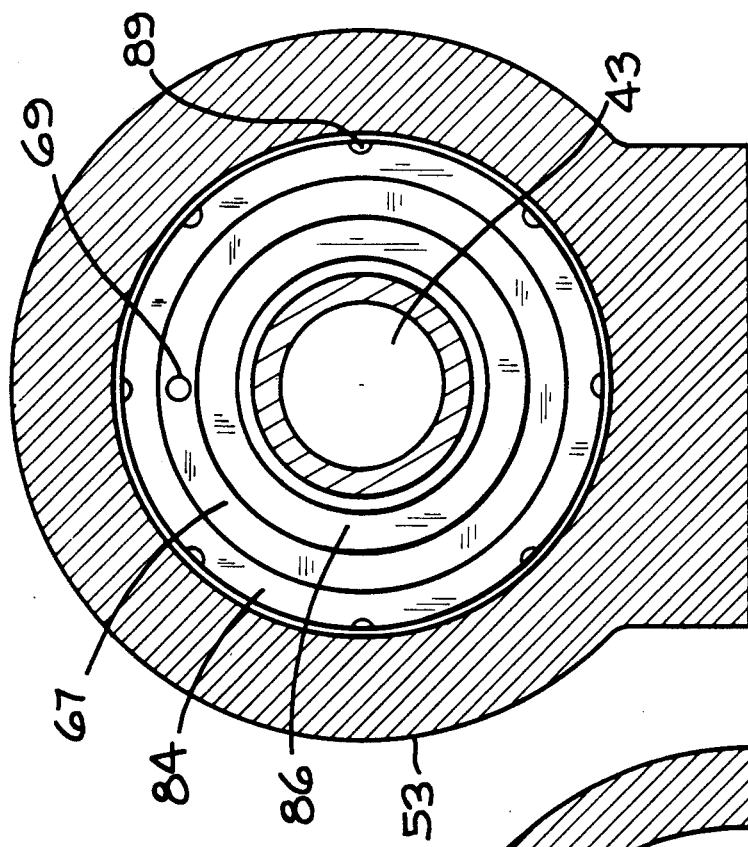
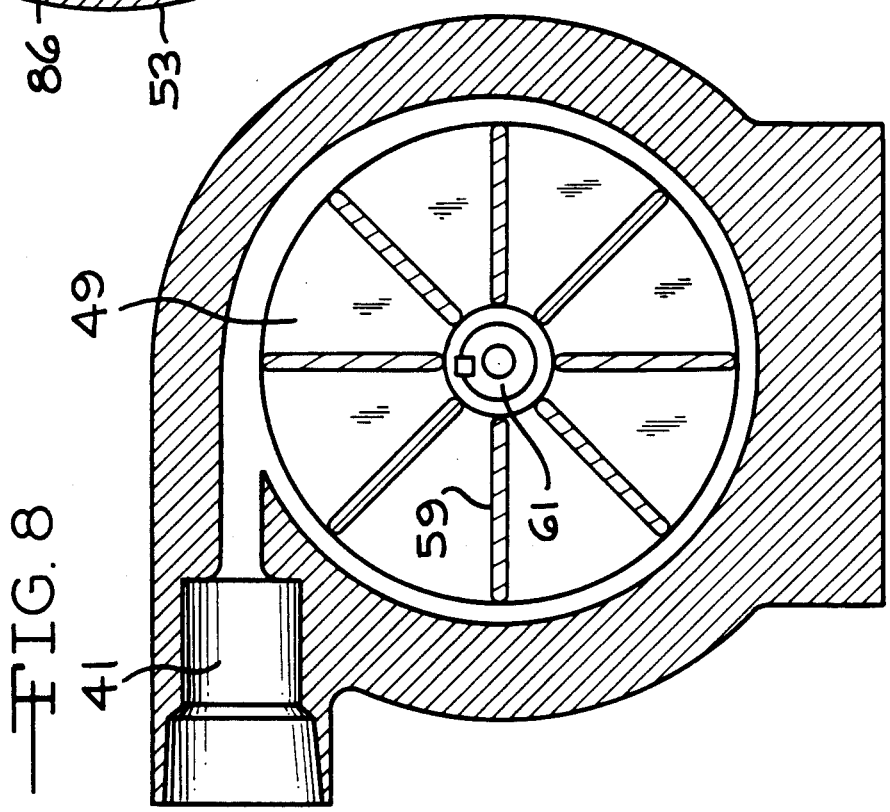

POWER RECOVERY PUMP TURBINE

This is a divisional of copending application Ser. No. 315,139, filed on Feb. 24, 1989.

BACKGROUND OF THE INVENTION

The invention relates to a new and useful power recovery pump turbine to reduce the energy requirements of many industrial and liquid purification processes that involve pumping liquid or gases at high pressures. This invention is particularly well-suited for use in reverse osmosis processes which are used to remove salt from sea water. In the reverse osmosis system and other systems in which the invention is particularly well-suited for use a liquid or gas is pumped at high pressure into a chamber. In the chamber a portion of the liquid or gas is purified or otherwise processed and drawn from the chamber. The remainder of the high pressure gas or liquid is discharged from the chamber as reject that is disposed. The reject is usually at a very high pressure and this pressure must be dissipated through the use of a throttling valve or other device. Usually the throttling valve reduces the pressure in the reject stream to essentially 0 psi so that all of the pressure energy in the reject stream is dissipated and provides no further benefit to the process. These energy losses can be very significant and result in a basic inefficiency in the system. In the use of reverse osmosis methods to remove salt from sea water these high energy costs associated with such an inefficient system have severely limited the commercial applications of the technology.

Several methods have been tried to recover the energy in the reject stream in order to reduce the operating costs of industrial or liquid purification processes. With regard to reverse osmosis systems, pistons with mechanically actuated valves that are positioned in devices resembling steam piston engines have been used. However, these devices have found no commercial acceptance due to the high cost and high maintenance required due to the mechanically complexed designs of the system. Furthermore, these systems produce strong shockwaves in the feed flow called water hammer, each time a valve opens or closes resulting in possible damage to components of the reverse osmosis system.

Other systems have used a turbine driven by the high pressure reject that is discharged from the system. The turbine is connected to the motor operating the feed pump. For good efficiency, a turbine must operate at very high speeds, usually exceeding 15,000 rpm. This high speed means that a reducing gear box must be installed between the turbine unit and the feed pump motor to effectively transfer the power from the turbine to the feed pump motor. The reducing gear box is a very expensive piece of equipment and requires a great deal of skill to install and maintain properly. A gear box also requires external means of lubrication further increasing the maintenance costs. It is also possible that the lubrication can contaminate the water that is feed to the reverse osmosis system. High speed seals must also be provided on the shaft between the turbine and the speed reducing gear box. These high speed seals are also expensive and usually not very reliable in field applications. For the above reasons there has been very little commercial acceptance of this type of power recovery system for use in reverse osmosis processes.

SUMMARY OF THE INVENTION

The invention is directed to an energy recovery pump turbine for use in industrial processes where a fluid is pumped at a high pressure into the process and at least a portion of the liquid is discharged from the process at a high pressure. A turbine is positioned to receive the high pressure discharge from the process. The turbine has an impeller positioned on a shaft and the discharged fluid engages the impeller and causes the impeller and shaft to rotate. A pump is position adjacent to the turbine to receive fluid being pumped to the process. The pump has an impeller mounted on a shaft and the shaft of the pump is operatively connected to the shaft of the turbine. Rotation of the turbine shaft causes the impeller and the shaft of the pump to rotate whereby the pump assists in supplying the fluid under pressure to the process and to recover energy from the high pressure fluid discharged from the process.

Also disclosed is a method for recovering energy from an industrial process where a fluid is pumped at a high pressure into the process and at least a portion of the fluid is discharged from the process at a high pressure. The high pressure discharged fluid is directed into the inlet of a turbine. The inlet of the turbine is caused to rotate by the high pressure discharged fluid. The turbine impeller is mounted on a rotatable shaft. An impeller of a pump that is mounted on the shaft is caused to rotate by the rotation of the shaft that is caused by the rotation of the turbine impeller. The fluid that is to be pumped to the process is directed to the inlet of the pump. The rotating impeller of the pump raises the pressure of the fluid supplied under high pressure to the process and recovers energy from the high pressure fluid discharged from the process.

It is an object of the invention to provide energy recovery pump turbine to utilize waste energy and industrial processes.

It is a further object of the invention to provide a turbine that is rotated by the high pressure discharge from an industrial process where the rotation of the turbine causes the impeller of a pump to rotate to assist in supplying liquid at a high pressure to the industrial process.

These and other objects of the invention will be more fully understood by reading the following detailed description of the invention in combination with the attached drawings.

DESCRIPTION OF THE DRAWINGS

FIG. 8 is a cross-sectional view taken along line 8—8 in FIG. 5.

FIG. 9 is a cross-sectional view taken along line 9—9 in FIG. 5.

DESCRIPTION OF THE PREFERRED EMBODIMENT

The invention is directed to a power recovery pump turbine that can be utilized to reduce the energy requirements of many industrial and liquid purification processes that involve pumping liquid or gases at high pressures. More particularly, the power recovery pump turbine recovers energy from the high pressure liquid or gas that is discharged from the purification process and uses this energy to pump the liquid or gas at high pressure into the purification process. The features of the invention will be more readily understood by referring to the attached drawings in connection with the following description.

The power recovery pump turbine of the present invention is particularly well-suited for use in a process to remove salt from sea water, called a reverse osmosis process. Accordingly, the invention will be described using the reverse osmosis process as the system where the power recovery pump turbine is utilized. It should be understood, however, that the power recovery pump turbine of the present invention can be used to reduce the energy requirements of many industrial and liquid purification processes that involve pumping liquid or gases at high pressures.

Figure 1:
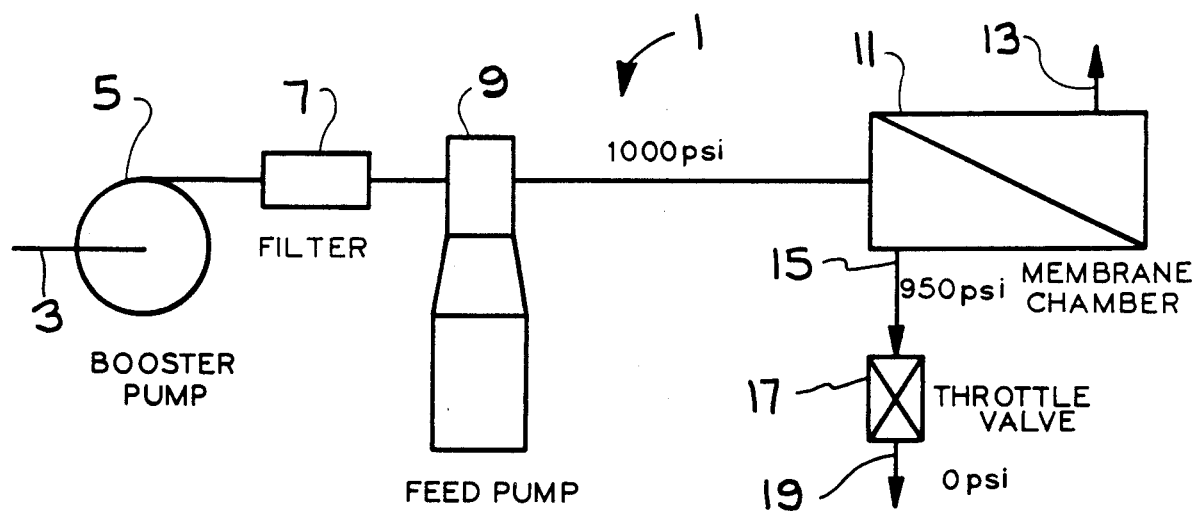
FIG. 1 is a schematic view of a prior art system to purify a liquid.

To better understand the environment in which the power recover pump turbine can be utilized, it is necessary to describe how a typical reverse osmosis system to remove salt from sea water operates. FIG. 1 shows a typical reverse osmosis system 1 where saltwater passes through an inlet pipe 3 into a booster pump 5. The booster pump increases the pressure of the saltwater to about 25 pounds per square inch and pumps the saltwater through a filter 7 where suspended impurities in the saltwater can be removed. From the filter 7 the saltwater passes into feed pump 9 where the pressure of the saltwater is increased to about 1000 psi. The high pressure (1000 psi) saltwater is then directed into a membrane chamber 11 where salt is removed from at least a portion of the sea water. As an example, if 100 gallons per minute of saltwater is supplied to the membrane chamber 11, approximately 25 gallons per minute of purified water will be produced by the membrane chamber. The purified water is discharged from the membrane chamber at a low pressure through the fresh water discharge line 13. Approximately 75 gallons per minute of concentrated saltwater brine is discharged from the membrane chamber through the brine discharge line 15. The concentrated brine is discharged from the chamber at about 950 psi and this concentrated brine is called the reject. The high pressure reject passes through a throttle valve 17 where the pressure of the concentrated brine reject is reduced so that the reject can be discharged through a waste line 19 for disposal. The pressure of the reject discharged through the waste line 19 is essentially 0 psi. The throttle valve 17 also acts to maintain pressure in the brine discharge line 15 to maintain the proper pressure in the membrane chamber to allow at least a portion of the saltwater to be purified.

In the example cited above for a reverse osmosis purification system the throttle valve lowers the pressure of the concentrated brine reject stream by approximately 950 psi. At a flow rate of 75 gallons per minute for the reject, the hydraulic power dissipated by the throttle valve is about 42 horsepower. This is a great deal of energy that must be put into the system by the feed pump 9 and this energy is effectively lost from the system as the energy is dissipated by the throttle valve 17.

Figure 2:
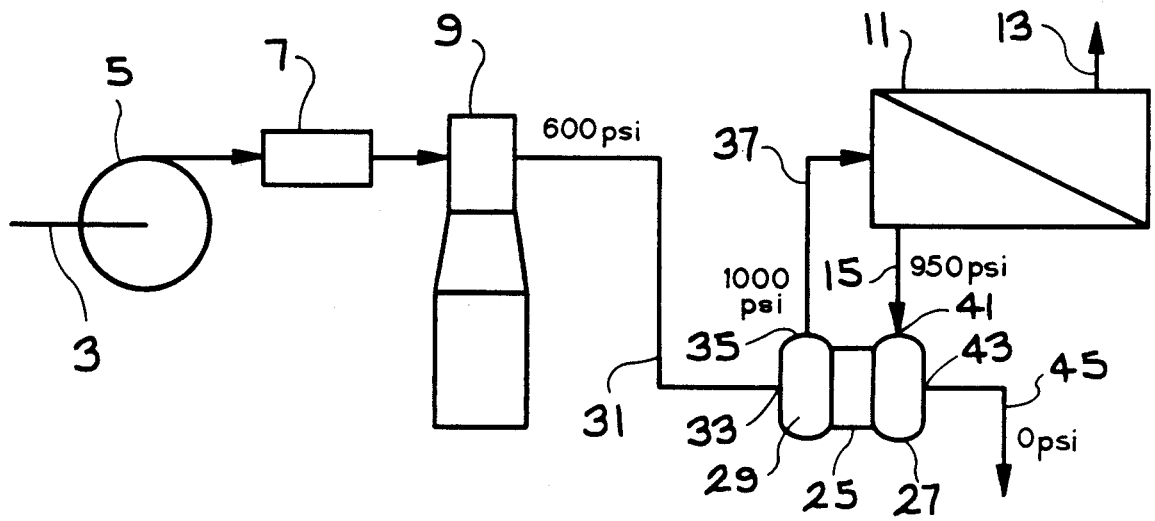
FIG. 2 is a schematic view of the power recovery pump turbine of the present invention used in a system.

FIG. 2 shows a reverse osmosis system where a power recovery pump turbine has been installed in the system. This system has essentially the same components as the previously described reverse osmosis system shown in FIG. 1 with the exception that a power recovery pump turbine 25 is operatively connected between the feed pump 9 and the membrane chamber 11 and the power recovery pump turbine is operatively connected to the brine discharge line 15 from the membrane chamber 11. The power recovery pump turbine has a turbine end 27 and a pump end 29. The pipe 31 from the feed pump 9 is connected to the pump inlet 33 on the pump end 29. The sea water passes through the pump inlet 33 through the pump end 29 and is discharged from the pump discharge 35. From the pump discharge 35 the sea water passes through pipe 37 into the membrane chamber 11. The portion of the sea water that is purified by the membrane chamber 11 passes from the chamber through discharge line 13. The concentrated brine reject passes from the membrane chamber 11 through brine discharge line 15. Brine discharge line 15 is operatively connected to the turbine inlet nozzle 41 on the turbine end 27 of the power recovery pump turbine 25. The concentrated reject passes through the turbine end 27 and is discharged from the turbine exhaust passage 43. From the turbine exhaust passage 43 the concentrated brine reject passes through waste line 45 and is disposed.

FIGS. 5–9 show the details of the power recovery pump turbine 25. The power recovery pump turbine unit has a center body 49, a pump end cap 51, and turbine end cap 53 and a rotor 55. The center body 49 and pump end cap 51 define pump impeller cavity 88 and the center body 49 and turbine end cap 53 define turbine impeller cavity 83. The rotor 55 consists of a pump impeller 57, turbine impeller 59 and a rotor shaft 61. The pump impeller 57 and the turbine impeller 59 are operatively connected to the rotor shaft 61. The pump impeller 57 is disposed to be located in the pump impeller cavity 88 and the turbine impeller 59 is disposed to be located in the turbine impeller cavity 83. The rotor shaft 61 is supported in the radial direction by a sleeve bearing 63. The rotor shaft 61 does not extend beyond the power recovery pump turbine thereby eliminating the need for external shaft seals.

Figure 5:
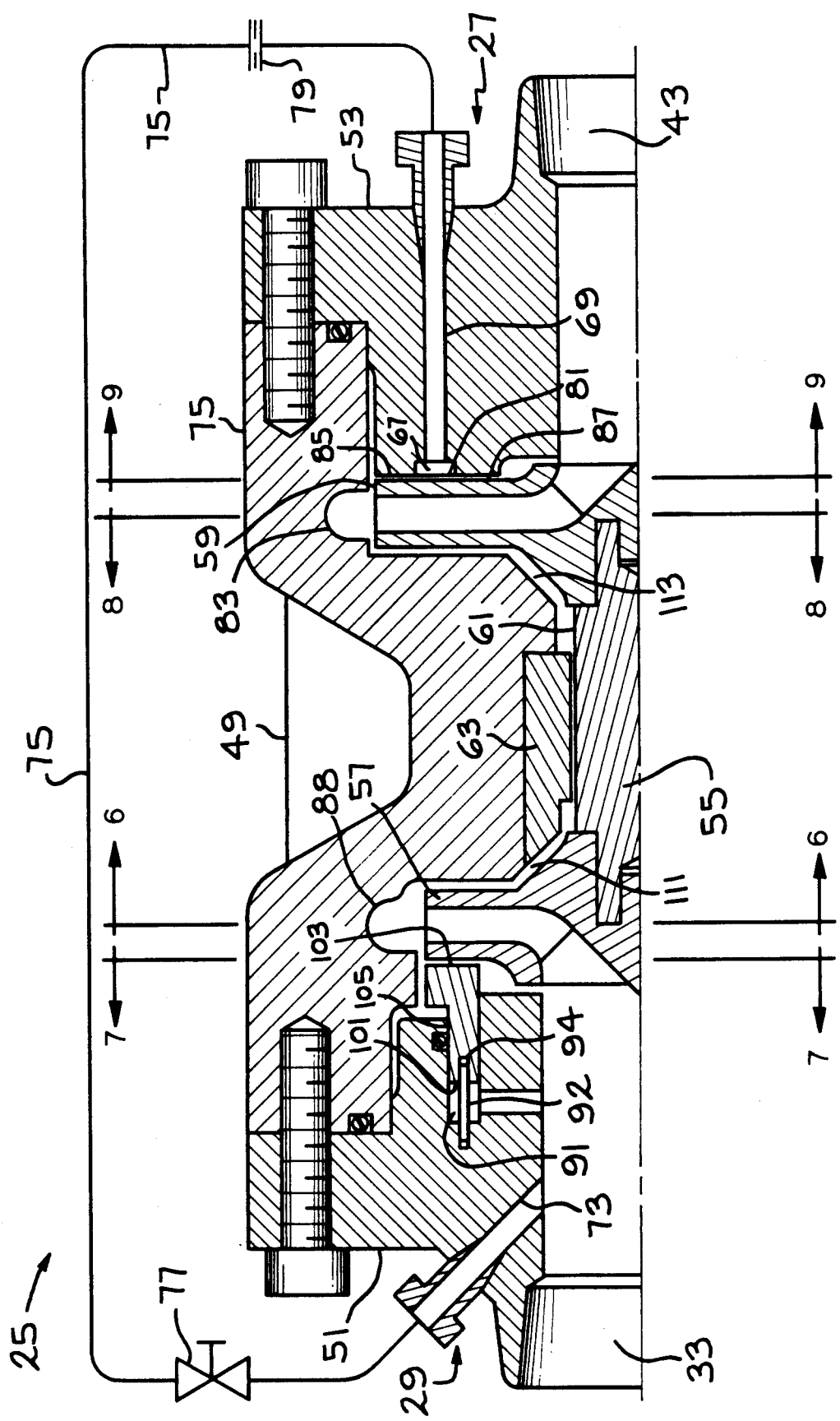
FIG. 5 is a partial cross-sectional view of the power recovery pump turbine.
Figure 7:
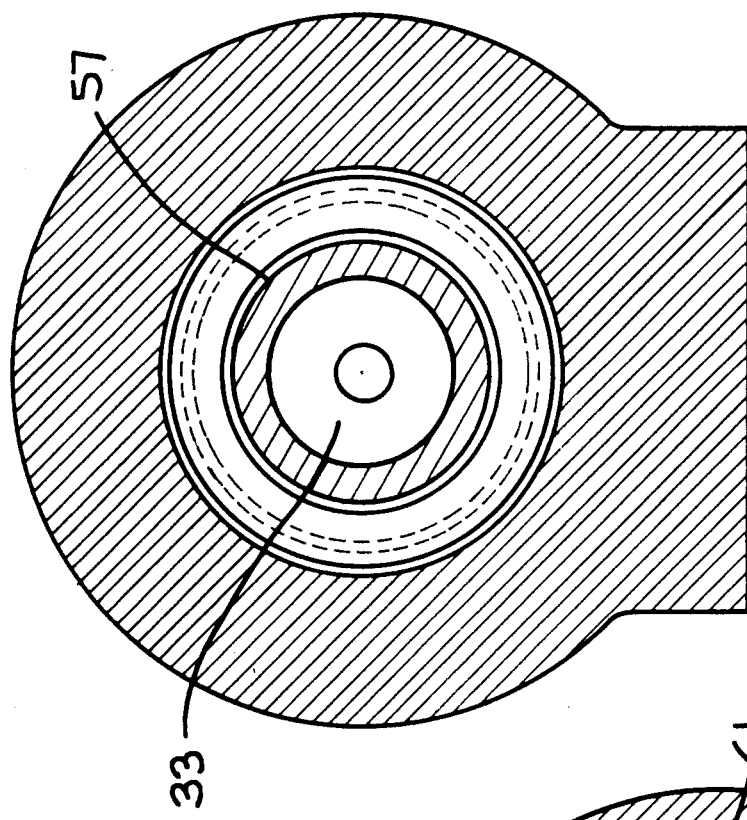
FIG. 7 is a cross-sectional view taken along line 7—7 in FIG. 5.
Figure 6:
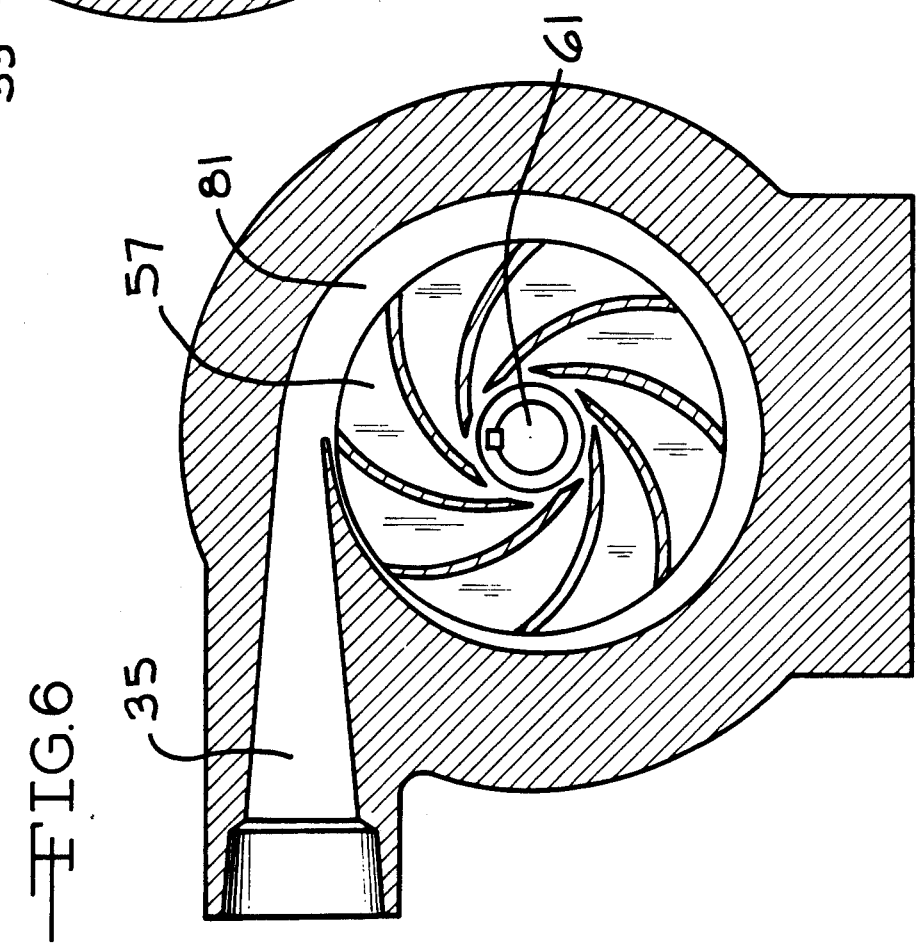
FIG. 6 is a cross-sectional view taken along line 6—6 in FIG. 5.

The inlet for the turbine end 27 of the power recovery pump turbine 25 is through turbine inlet nozzle 41 shown in FIG. 8. The turbine inlet nozzle 41 is connected to the brine discharge line 15 from the membrane chamber 11. The turbine exhaust passage 43 as shown in FIGS. 5 and 9 connects to waste discharge line 45. On the pump end 29 of the power recovery pump turbine 25 the pump inlet 33, shown in FIGS. 5 and 7, is connected to feed pipe 31 from the feed pump 9. The pump discharge passage 35 shown in FIG. 6 is connected to a pipe 37 that leads to the membrane chamber 11.

A groove 67 is located in the turbine end cap 53 and forms an annular ring in the turbine end cap. The groove is in communication with the turbine impeller cavity 83 where the turbine impeller 59 is located. A passageway 69 passes through the turbine end cap 53 and is in communication with the groove 67. A passageway 73 passes through the pump end cap 51 and is in communication with the pump inlet 33. A conduit 75 extends between and connects the passageway 69 in the turbine end cap 53 with the passageway 73 in the pump end cap 51. A valve 77 is positioned in the conduit 75 adjacent to the pump end cap 51. An orifice plate 79 is positioned in the conduit 75 adjacent to the turbine end cap 53. The orifice plate 79 has a plurality of orifices located therein to regulate the flow of fluid through the conduit 75. The orifice plate prevents quick changes in the rate of fluid flow through the conduit 75. An axial clearance 81 extends between the outer periphery of the turbine impeller 59 and the turbine end cap 53. The axial clearance has an outer axial clearance 85 that is located on the side of the groove 67 that is spaced apart from the rotor shaft 61 and an inner axial clearance 87 that is located on the side of the groove 67 that is adjacent to the rotor shaft 61. The groove 67 is in communication with the axial clearance 81. The cross-sectional area of the annular ring formed by the groove 67 is from about 1.5 to about 2.5 times the cross-sectional area of the rotor shaft 61. In practice it has been found that the groove 67 functions well if its cross-sectional area is about 2 times the cross-sectional area of the rotor shaft 61.

Shown in FIG. 9 there is an outer seal surface 84 and an inner seal surface 86 located in the turbine end cap 53. The outer and inner seal surfaces are positioned adjacent the outer axial clearance 85 and inner axial clearance 87, respectively. Shallow grooves 89 extend radially from one side of the outer sealing surface 84 but not all the way across the outer sealing surface. The shallow grooves 89 form a hydrodynamic thrust bearing on the outer sealing surface. It should be understood that the shallow grooves could alternatively be position on the inner seal surface 86 to form a hydrodynamic thrust bearing. The portion of the outer sealing surface that contains the shallow grooves 89 produces fluid film hydrodynamic lift during rotation of the turbine impeller 59. The other portion of the outer sealing surface 84 provides a seal between the high pressure fluid in the groove 67 and the regions of lower pressure at the turbine exhaust passage 43 and the outer periphery of the turbine impeller 59. Once the turbine impeller 59 has achieved sufficient operating speed to generate hydrodynamic lift, the flow of fluid through the conduit 75 can be shut off by the valve 77. In this configuration the sealing surface contains both the hydrodynamic thrust bearing and a plain sealing area needed to reduce leakage between zones of different pressure.

The radial width of the inner seal surface 86 should be greater than the radial width of the outer seal surface 84 due to the higher pressure differential between the groove 67 and the turbine exhaust passage 43 than between the groove 67 and the turbine inlet 41. The inner and outer sealing surfaces may be separately attached to the turbine end cap 53 and can be made from the same or different material than the turbine impeller 59.

As shown in FIG. 5, on the pump end 29 of the power recovery pump turbine 25 there is a pump impeller cavity 88 and the pump impeller 57 is positioned in this cavity. In the pump end cap 51 there is a seal cavity 91. A wear ring 93 is slideably positioned in the seal cavity 91. The wear ring is positioned so that it extends part way into the seal cavity 91. O-rings 95 are positioned adjacent the portion of the wear ring 93 that extends into the seal cavity 91 to provide a seal around the wear ring 93. A portion of the wear ring 93 extends from the seal cavity 91 and extends towards the pump impeller 57. This portion of the wear ring 93 has an increased cross-sectional area that acts as a stop to limit the movement of the wear ring in the seal cavity 91 in a direction away from the pump impeller 57. A passageway 97 extends from the seal cavity 91 to the pump inlet passageway 33. The portion of the wear ring 93 that extends into the seal cavity 91 terminates in a face 101. The end of the wear ring 93 that extends from the seal cavity 91 terminates in a seal face 103 that is adjacent to the pump impeller 57. The area of face 101 is approximately 0.4 of the area of the seal face 103. The wear ring 93 also has a step face 105 that faces the pump end cap 51. The area of the step face 105 is approximately 0.6 of the area of the seal face 103. Seal face 103 is positioned so that it is substantially parallel to the side of the pump impeller 57. Face 101 and step face 105 are disposed so that they are substantially parallel to seal face 103. The wear ring 93 is positioned so that it is free to move axially in the seal cavity 91. A pin 92 extends from the pump end cap 51 into the seal cavity 91 and into a cavity 94 in the wear ring 93. The pin 92 prevents the wear ring 93 from rotating but does not prevent axial movement of the wear ring in the seal cavity 91.

Positioned between the pump impeller 57 and turbine impeller 59 is sleeve bearing 63. There is a chamber 111 that is positioned between the sleeve bearing 63 and the pump impeller 57. The chamber 111 is in communication with the pump impeller cavity 88. On the opposite side of the sleeve bearing 63 there is an annular space 113 that connects to the turbine impeller cavity 83. The sleeve bearing 63 is disposed around the rotor shaft 61 so that there is small seal clearance 115 between the rotor shaft 61 and the sleeve bearing 63. The seal clearance 115 provides a path of communication between the chamber 111 and the annular space 113.

In operation of the power recovery pump turbine 25, saltwater from the feed pump 9 enters the pump inlet 33 passes through the pump end 29 of the power recovery pump turbine and is directed to the membrane chamber 11. The salt brine reject stream from the membrane chamber 11 passes through brine discharge line 15 into the turbine inlet nozzle 41. The brine passes through the turbine end 27 and is discharged through the turbine exhaust passage 43. The turbine inlet nozzle 41 converts the high pressure brine reject flow into a high velocity flow. The high velocity flow brine enters the turbine impeller cavity 83 and causes the turbine impeller 59 to rotate. As the turbine impeller 59 is mounted on rotor shaft 61 and the pump impeller 57 is also mounted on the rotor shaft 61 the rotation of the turbine impeller causes the pump impeller to rotate. The rotating pump impeller 57 draws saltwater from the feed pump into the pump inlet 33. The saltwater passes into the pump impeller cavity 88 and the rotating pump impeller 57 raises the pressure of the saltwater. The saltwater is then directed out through the pump discharge 35 and is directed to the membrane chamber 11. In this manner the energy in the high pressure discharge from the membrane chamber 11 can be utilized to assist in pumping saltwater into the membrane chamber. As an example, once the system is running the feed pump 9 can deliver saltwater at approximately 600 psi to the power recovery pump turbine 25. The 950 psi concentrated brine reject is utilized to rotate the turbine impeller 59 which rotates the pump impeller 57 so that the saltwater entering the pump inlet 33 can be boosted from 600 psi as it enters the pump inlet to 1000 psi as it is discharged from the pump discharge 35.

The use of the power recovery pump turbine greatly reduces the pressure increase in the saltwater required to be produced by the feed pump 9 and this significantly reduced the power requirements for the feed pump. Reducing the power requirement for the feed pump has a significant impact on the energy cost for operating the feed pump 9. At the same time the reduced feed pump discharge pressure reduces the stress on the pump and should extend the life of the feed pump. In addition, the concentrated saltwater brine that is discharged through the turbine exhaust passage 43 is at a very low or zero pressure so that the concentrated saltwater brine can be easily disposed of. This eliminates the need for a throttle valve to reduce the pressure of the concentrated saltwater brine that is discharged from the membrane chamber 11.

For the power recovery pump turbine to work effectively several significant problems must be overcome. At the pump inlet 33 the saltwater is delivered at a very high pressure (about 600 psi) from the feed pump 9. This high pressure generates a strong axial force on the components inside of the power recovery pump turbine. This high axial force must be accomodated through a simple reliable and low cost thrust bearing for the rotor shaft 61. This thrust bearing must display low drag characteristics and cannot require lubrication as the lubricants could contaminate the water passing to the membrane chamber 11. The power recovery pump turbine must also be able to transfer a significant portion of the hydraulic energy available in the concentrated brine reject stream from the membrane chamber 11 to justify the cost of the power recovery pump turbine. Unfortunately, the combination of high pressure differentials and low flow rates found in most reverse osmosis system are conditions that are very unfavorable for good efficiency in turbo machinery. The only way to obtain good turbine efficiency is to have very high rotational speeds for the turbine impeller and this causes problems with the bearings for the rotor shaft. The power recovery pump turbine must also be able to operate for several years with little or no maintenance. Most reverse osmosis systems are used in applications where very little maintenance service is available. Thus the power recovery pump turbine component of the reverse osmosis system must require very little maintenance. In order to maintain good efficiency for the power recovery pump turbine it is necessary to have very close tolerances between the internal seals and these close tolerances must be maintained during the operation of the power recovery pump turbine. Due to the conditions in which reverse osmosis system operate it is inevitable that wear and corrosion will take place on the components of the power recovery pump turbine. Accordingly, it is necessary to have an automatic system to adjust the seal clearances to accomodate the wear and corrosion in the power recovery pump turbine.

As set forth above, the pressure at the pump inlet 33 is approximately 600 psi and the pressure at the turbine exhaust passageway is essentially zero. This large pressure differential acts to push the rotor shaft 61 and the attached pump impeller 57 and turbine impeller 59 towards the turbine exhaust passage 43. The force acting on the rotor shaft 61 and the pump impeller 57 and the turbine impeller 59 can exceed 500 pounds.

Conventional thrust bearings are not suited to handle the loads that can be placed upon the rotor shaft 61 of the power recovery pump turbine. Rolling contact thrust bearings such as ball or roller bearings must operate with proper lubrication such as oil or grease. Such bearings require two or more shaft seals that are able to separate the high pressure water from the bearing. The shaft seals would be very expensive, require high maintenance and always create the possibility of contamination of the saltwater with lubricants. A water lubricated fluid film thrust bearing is another possibility. However, in order for a water lubricated fluid film thrust bearing to function, the shaft located in the bearing must revolve at very high rates of speed in order to establish the lubricating film of water between the rotating and stationary thrust surfaces. In a power recovery pump turbine the axial thrust can be present when the rotor is revolving very slowly or is completely stationary. For example, during the start-up of the system the feed pump will quickly develop its full pressure yet the rotor shaft and impellers in the power recovery pump turbine will not begin to rotate until the saltwater brine reject from the membrane chamber 11 is directed to the turbine inlet nozzle 41 to cause the turbine impeller 59 to rotate. The rotor shaft 61, turbine impeller 59 and pump impeller 57 will rotate slowly at the start-up due to rotor inertia. Thus, in the power recovery pump turbine a fluid film thrust bearing would not be able to handle the axial thrust loads encountered during portions of the operational cycle for the power recovery pump turbine.

To handle the axial loads a thrust balancing technique is used by the power recovery pump turbine. A groove 67 is located in the turbine end cap 53. A passageway 69 extends through the turbine end cap 53. The groove 67 is in communication with the turbine impeller cavity 83. A passageway 73 extends through the pump end cap 51 as in communication with the pump inlet 33. A conduit 75 extends from the passageway 69 in the turbine end cap 53 to the passageway 73 of the pump end cap 51. The internal surface of the turbine end cap is machined to precisely the same contour as the side wall of the turbine impeller 59. When the feed pump is operating, the fluid pressure in the pump inlet 33 is somewhat higher than in the turbine impeller cavity 83. This pressure differential can cause the rotor shaft 61, the pump impeller 57 and the turbine impeller 59 to move in a direction towards the turbine end cap 53. When this occurs the outer axial clearance 85 and inner axial clearance 87 between the turbine impeller 59 and the turbine end cap 53 is reduced resulting in an effective sealing of the groove 67 from the turbine impeller cavity 83 and the turbine exhaust passageway 43. This sealing effect combined with the flow of liquid through conduit 75 causes the fluid pressure in the groove 67 to buildup and this prevents any further movement of the rotor shaft 61 towards the turbine end cap 53. If the rotor shaft 61 moves away from the turbine end cap 53, there is an increase in the outer axial clearance 85 and inner axial clearance 87, and this allows the water supply to the groove 67 to drain out quickly through the axial clearance into the turbine exhaust passageway 43. This drainage reduces the pressure in the groove 67 and reduces the force acting on the rotor shaft to move the rotor shaft away from the turbine end cap 53. Usually when the saltwater rapidly drains out of the groove 67 there is a tendency for the rotor shaft 61 to move back towards the turbine end cap 53. The orifice plate 79 helps to further reduce the pressure in the groove 67 during period of high drainage as the orifice plate restricts the quick change of flow conditions in the conduit 75. Thus, there can not be a drastic increase in the flow rate of saltwater through the conduit 75 into the groove 67.

This connection by the groove 67, the passageway 73 and conduit 75 between the turbine impeller cavity 83 and the pump inlet 33 insures that there is never contact between the turbine end cap 53 and the turbine impeller 59 even during transient conditions such as start-up of the power recovery pump turbine. Also, any wear that may occur due to such factors as corrosion or errosion simply results in the rotor shaft moving axially toward the turbine end cap 53 by a distance sufficient to compensate for the material that has been lost from the turbine end cap 53 or the turbine impeller 59 due to the effects of corrosion or errosion. Therefore, the thrust balancing features of the power recovery pump turbine should last almost indefinitely and insure that the rotor shaft 61, the turbine impeller 59 and the pump impeller 57 are in the proper position. This thrust balancing technique also eliminates the need for wear rings for the turbine impeller cavity 83. Normally wear rings are used to minimize the leakage between the high pressure in the turbine impeller cavity 83 and the relatively low pressure in the turbine exhaust passageway 43. The extremely small axial clearance 85 between the turbine impeller cavity 83 and the turbine exhaust passageway 43 provides an effective seal and does away with the requirement for wear rings.

Figure 10:
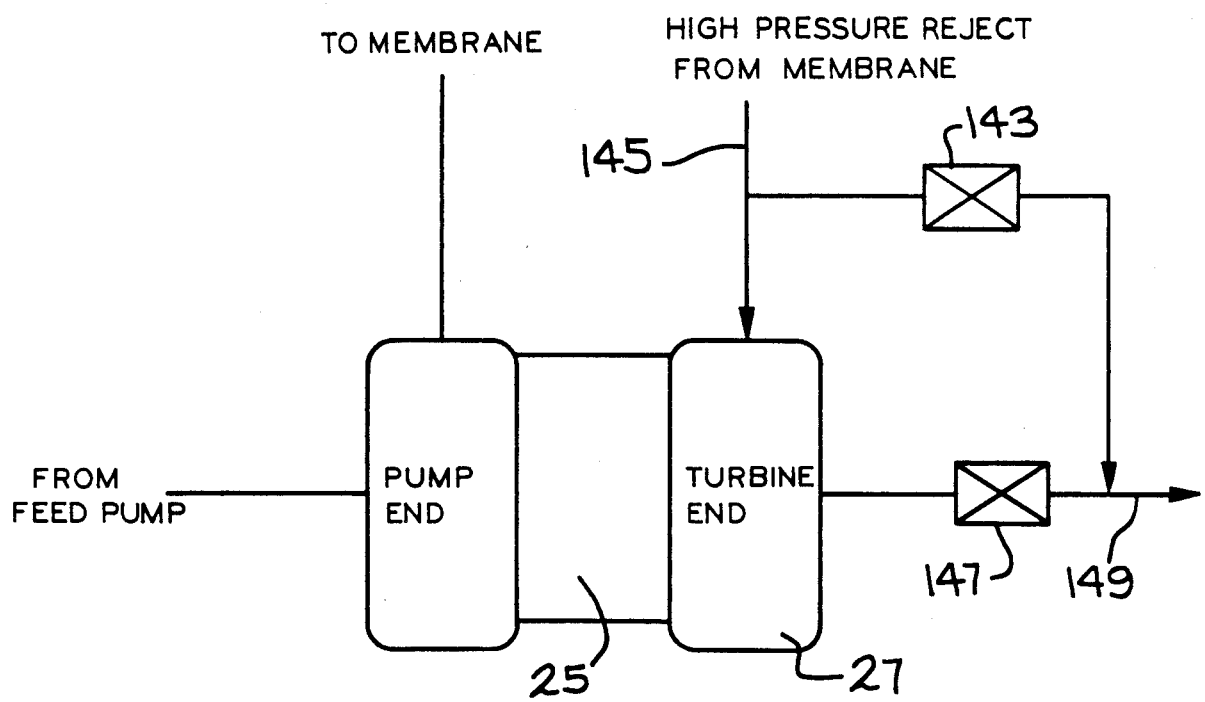
FIG. 10 is another embodiment of the present invention.

The power recovery pump turbine 25 is constructed to insure adequate lubrication and cooling of the sleeve bearing 63 (as shown in FIG. 10). The pressure in the chamber 111 which is on the pump side of the sleeve bearing 63 is somewhat higher than the pressure in the annular space 113 which is on the turbine side of the sleeve bearing. This pressure differential results in the flow of liquid from the chamber 111, through the seal clearance 115 into the annular space 113. This flow of liquid helps to provide adquate fluid film to lubricate the bearing and also insures that frictionally generated heat is carried away from the sleeve bearing 63. At the same time the small seal clearance 115 effectively minimizes excessive leakage between the chamber 111 and the annular space 113. Thus the arrangement shown in FIG. 10 for the rotor shaft 61 and sleeve bearing 63 provides for bearing lubrication, bearing cooling and shaft sealing in a very simple manner.

In FIG. 5 there is shown the seal that provides a long-lasting and effective seal between the pump impeller discharge and the pump inlet. A wear ring 93 extends part way into the seal cavity 91 in the pump end cap 51. The seal cavity 91 is sealed by O-rings 95 that engage the wear ring 93. The wear ring 93 is free to move axially in the seal cavity 91. The pin 92 prevents rotation of the wearing ring 93 in the seal cavity 91. The seal cavity 91 is in communication with the pump inlet 33 through passageway 97. In operation the pump impeller cavity 88 becomes filled with fluid that is at a somewhat higher pressure than the fluid in the pump inlet 33. The average pressure acting on the seal face 103 is about halfway between the pressure in the pump impeller cavity 88 and the pump inlet 33. The net force acting to push the seal face 103 away from the side wall of the pump impeller 57 equals the average pressure times the area of the seal face 103. The force acting to push the seal face 103 towards the side wall of the pump impeller 57 equals the sum of the area of the face 101 in the seal cavity 91 times the suction pressure of the pump and the area of the step face 105 times the pressure in the pump impeller cavity 88. With the proper ratio between the step face 105 and the face 101, the axial seal clearance between the seal face 103 and the side wall of the impeller 57 can be maintained as less than 0.005 inches. This close clearance reduces the leakage from the impeller cavity 88 to the pump inlet 33 to a negligible value.

In reverse osmosis systems, the flow rate into and out of the membrane chamber can change due to the changes in the demand for fresh water. The power recovery pump turbine rotor speed automatically increases or decreases to meet minor changes in the flow rate. FIG. 10 illustrates the use of two valves to handle extremely large changes in the flow rate into and out of the membrane chamber. The first valve 143 is attached to the brine discharge line 145 between the power recovery pump turbine 25 and the membrane chamber (not shown). If the pressure in the membrane chamber becomes too high due to increased flow of the concentrated saltwater brine from the membrane chamber, the first valve 143 will open. A second valve 147 is positioned on the disposal line 149 that extends from the turbine end 27 of the power recovery pump turbine 25. The second valve 147 restricts turbine outlet flow if the pressure in the membrane chamber becomes too low due to reduced flow of the concentrated saltwater brine that is discharged from the membrane chamber. The first valve 143 and second valve 147 may be manually or automatically operated.

Figure 11:
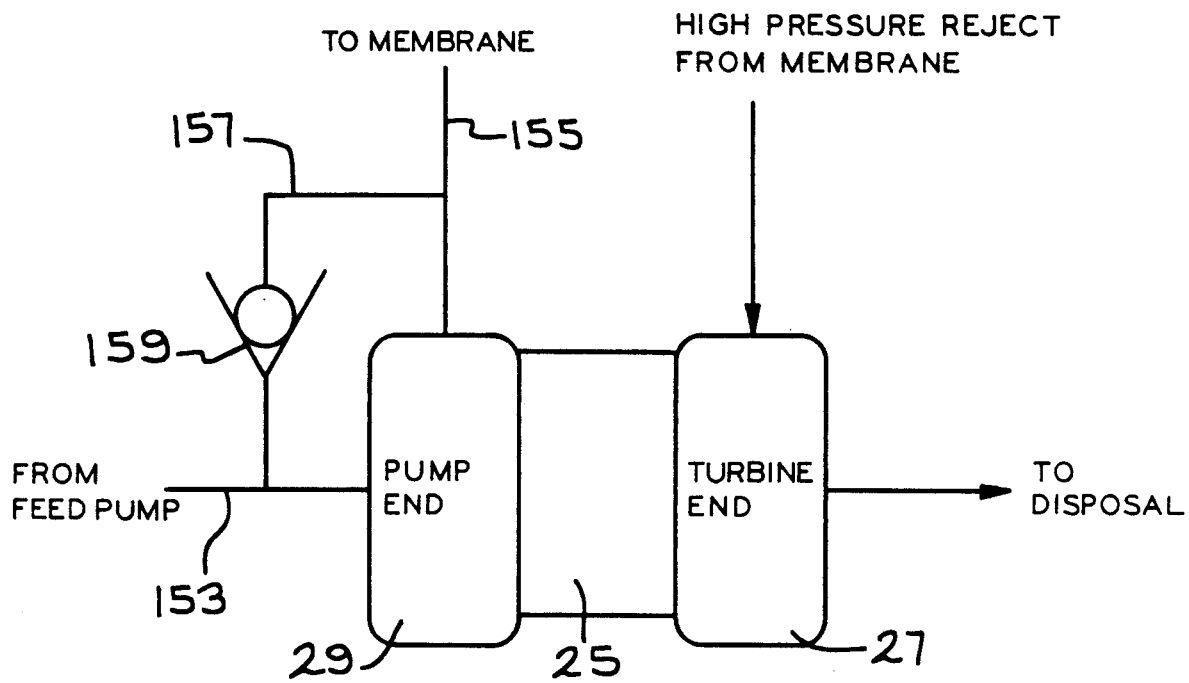
FIG. 11 is another embodiment of the present invention.

In some applications it is possible that the concentrated saltwater brine flow rate from the membrane chamber is insufficient to operate the power recovery pump turbine in a normal manner. In such cases the turbine end of the power recovery pump turbine does not rotate rapidly enough to provide force to the pump end of the power recovery pump turbine to assist in pumping the salt water to the member chamber. In this situation the power recovery pump turbine can actually reduce feed pressure through the membrane chamber and thereby increase the amount of work required by the feed pump. In this situation the power recovery pump turbine could be a liability to the system rather than act to reduce energy costs. FIG. 11 shows a configuration for the power recovery pump turbine that can act to reduce the pressure of the saltwater that is fed from the feed pump to the membrane chamber. In this configuration a pipe 153 directs the saltwater from the feed pump to the pump end 29 of the power recovery pump turbine 25. Feed pipe 155 directs the saltwater from the pump end 29 of the power recovery pump turbine 25 to the membrane chamber (not shown). A passageway 157 extends between the pipe 153 and the feed pipe 155 to provide an alternative path for the flow of saltwater that bypasses the power recovery pump turbine. A check valve 159 is positioned in the passageway 157. During normal operation of the power recovery pump turbine, the pressure is higher in the feed pipe 155 that discharges from the pump end 29 than in the pipe 153 that supplies saltwater to the pump inlet. In this situation the higher pressure in the feed line pipe 155 will act upon the check valve 159 and keep the check valve closed so that saltwater will not flow from the pipe 153 through the passageway 157. However, in those instances where the pressure in the pipe 153 is higher than the pressure in the feed pipe 155 due to insufficient flow of concentrated saltwater brine through the turbine end 127 of the power recovery pump turbine 25, the check valve 159 will open due to the higher pressure in pipe 153. This provides an alternative flow path for the saltwater through the passageway 157 to avoid the power recovery pump turbine. The passageway 157 and check valve 159 provide a system whereby any undesireable pressure loss in the stream of saltwater that is fed to the membrane chamber can be significantly reduced or eliminated.

Figure 3:
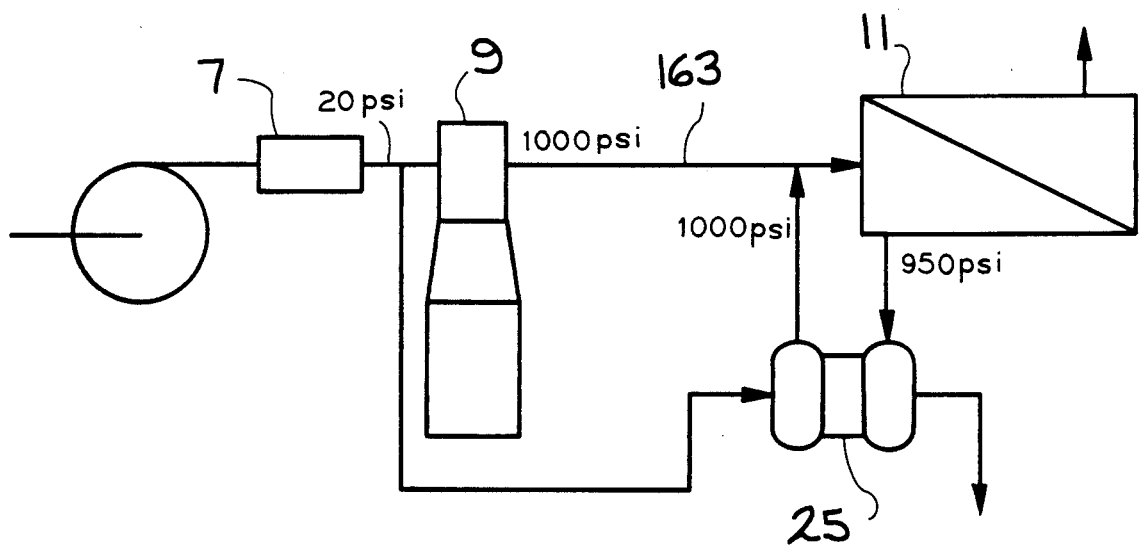
FIG. 3 is another embodiment of the present invention.

FIG. 3 shows an alternative embodiment where a power recovery turbine pump 25 is pumping in parallel with the feed pump 9. The saltwater leaving the filter unit 7 is split into two streams. One stream passes through the feed pump 9 which raises the water pressure to the level required by the membrane chamber 11. The other stream of saltwater passes through the power recovery turbine pump 25 which also raises the water pressure to the level required by the membrane chamber 11. The streams of saltwater discharge from the feed pump 9 and from the power recovery pump turbine 25 are combined into a single stream just prior to entering the membrane chamber 11. The high pressure concentrated saltwater brine that is discharged from the membrane chamber 11 is directed into the power recovery pump turbine 25 as discussed previously. Using the feed pump 9 and power recovery pump turbine 25 to pump in parallel allows the use of a lower capacity feed pump as the feed pump only handles a portion of the total feed flow that is supplied to the membrane chamber 11. This reduced flow rate also reduces the power required by the feed pump 9. Another advantage is that if the power recovery pump turbine should fail or be removed from the reverse osmosis system, the feed pump could still provide a significant quantity of saltwater into the membrane chamber 11 at an adequate pressure to produce fresh water.

Figure 4:
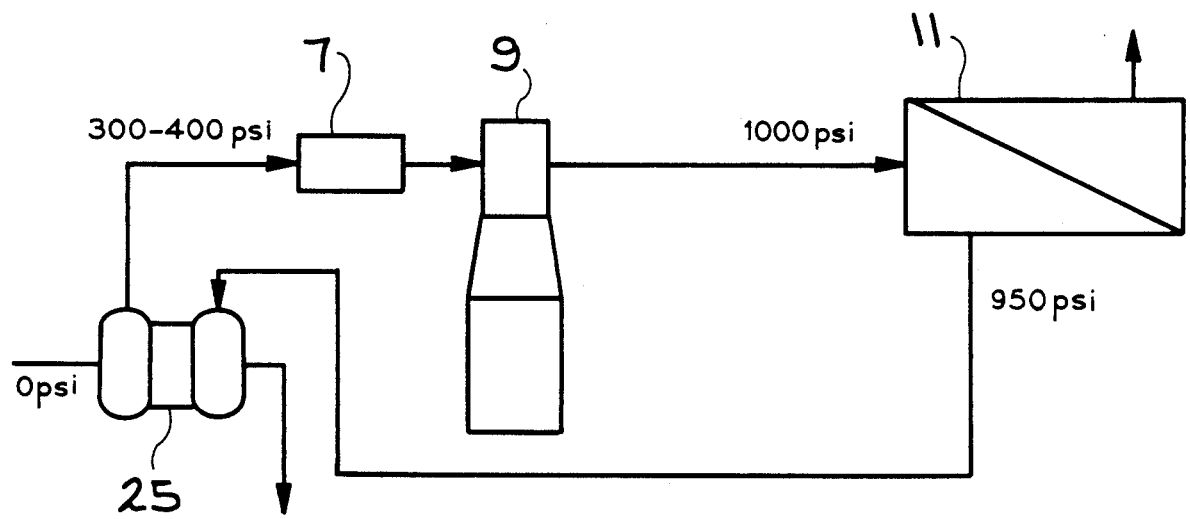
FIG. 4 is another embodiment of the present invention.

Another alternative embodiment that can be used in reverse osmosis system is shown in FIg. 4. In this embodiment the power recovery pump turbine 25 is positioned ahead of the feed pump 9 and filter 7. In this configuration the power recovery pump turbine eliminates the booster pump shown in FIG. 2. In this configuration the power recovery pump turbine acts as previously described to increase the pressure of the saltwater that is to be purified. However, in this embodiment the pressure is increased before the saltwater passes through the filter and is fed into the feed pump 9. However, the same general benefits are derived as the feed pump 9 does not have to provide as much of an increase in the pressure of the saltwater and this greatly reduces the power requirements for the feed pump and can extend the life of the feed pump. At the same time, energy is recovered from the high pressure concentrated saltwater brine that is discharged from the membrane chamber 11. This energy is effectively recaptured and utilized by the power recovery pump turbine 25 to reduce the overall energy requirements of the reverse osmosis system.

In reverse osmosis systems it is very important that the rate of the purified water or permeate production be regulated. In such a system, if the permeate flow becomes too high for a given feed flow, the quality of the permeate can decline (i.e., the permeate becomes saltier). Essentially, too large of a quantity of water is forced through the membrane in the membrane chamber for the given feed flow resulting in greatly increased salinity of the reject stream that is discharged from the membrane chamber. This occurs because more purified water is being extracted from the saltwater supplied to the membrane chamber which increases the salinity of the reject. This increased reject salinity means there is a higher salt passage rate through the membrane thereby increasing salinity of the permeate. On the other hand, if the permeate flow should become too low then the water demands can exceed the permeate flow rate and this is not acceptable. The rate of the permeate production is regulated by controlling the membrane pressure and the rate of feed flow. Normally this regulation is done with a series of valves which must be adjusted by an operator or a computer system in response to changes in the permeate output and quality.

The output of permeate may change for several reasons such as changes in the salinity of the water or the temperature of the water in the feed stream. It is also possible for the membrane to compact after years of use and a compaction of the membrane can also effect the output of permeate. In a reverse osmosis system if the temperature of the sea water decreases, it decreases the effectiveness of the membrane chamber and for a given membrane pressure and feed flow rate the output of permeate decreases. Conversely, if the temperature of the saltwater increases, the membrane chamber becomes more permeable and the output of permeate increases. In order to prevent excessive permeate output with warm feed water and insufficient permeate output with cold feed water, the membrane pressure must be actively controlled. However, as set forth above, the valving arrangements utilized in the past require personal attention that is expensive and not always available. Thus, it would be desirable to have a mechanism where the membrane pressure is controlled under changing conditions to produce the desired amount of permeate.

The power recovery pump turbine of the present invention can be utilized to control the membrane pressure to produce the desired quantity of permeate. The power recovery pump turbine 25 effects the membrane pressure in two ways: by the amount of boost developed by the pump end 29 and by the amount of flow resistance created in the reject line 15 by the turbine end 27. Focusing on the amount of resistance in the reject line, the power recovery pump turbine 25 has a unique pressure versus flow relationship ideally suited for reverse osmosis systems. To appreciate the advantages of the power recovery pump turbine it is helpful to compare this device with conventional ways of controlling membrane pressure. In a normal reverse osmosis system a valve or orifice plate is normally used to control the membrane pressure. The valve or orifice plate creates a flow resistance on the reject line and the valve or orifice plate has a generally square relationship between the membrane pressure and the flow rate. That is, if the flow rate is halved the pressure resistance decreases to one-fourth. In a reverse osmosis system, if the feed temperature increases then the reject flow decreases as more sea water passes through the membrane chamber 11 and becomes permeate. This results in a lower reject flow which reduces the pressure resistance of the valve but the reduction is not enough to reduce the membrane pressure and to reduce the production rate of permeate. Therefore, the valve on the reject line must be mannually opened or adjusted to obtain the desired membrane pressure to adjust the production rate of the permeate.

The power recovery pump turbine 25 has a different pressure versus flow characteristic that is particularly well-suited for a reverse osmosis sytem. Specifically, cutting the reject flow in half results in the pressure resistance decreasing to one-fifth of its former value rather than one-fourth as with a valve or orifice plate. The somewhat lower membrane pressure is in many cases sufficient to prevent excess permeate output. For example, if the temperature of the feed water decreases, the flow rate through the reject line 15 increases since less permeate is being produced. The power recovery pump turbine will then produce a flow resistance in the reject line 15 that is greater than the pressure increase caused by a valve or orifice plate. The result is that the permeate production does not drop off as much as with a valve or orifice plate. The net effect of using the power recover pump turbine 25 is that it reduces overproduction of permeate when the feed water temperature increases and minimizes under-production of permeate when the feed water temperature drops. This is done without the intervention by an operator or any auxillary control system. The same permeate regulation also occurs when the feed water salinity or membrane compaction changes.

The reason for the power recovery pump turbine unique pressure versus flow relationship is that the rotation rate of the pump and turbine impeller is completely free to adjust at all times. Specifically, a low rotation rate causes a low pressure resistance and a high rotation rate causes a high pressure resistance through the turbine for a given flow. A low rotation rate occurs when the feed flow is relatively high compared with the turbine flow such as when the temperature of the feed water increases. Conversely, a high rotation rate occurs when the feed flow is relatively low compared with the turbine flow rate such as when the temperature of the feed water decreases. Basically, the rotation rate of the pump 57 and turbine 59 impellers which comprise the rotor 55 of the power recovery pump turbine is a function of the ratio of the reject flow from the membrane chamber to the feed flow of saltwater supplied to the membrane chamber. This ratio is called the reject ratio. A high reject ratio tends to produce a high rotor rotation rate which increases turbine flow resistance which increases the resistance to the flow of reject from the membrane chamber 11. The high reject ratio results in the pump impeller 57 rotating at a higher speed which increases the pressure of the saltwater supplied to the membrane chamber 11. One or both of these responses (depending on if the feed pump is a positive displacement type or a centrifugal type) results in a higher membrane pressure. A higher membrane pressure automatically produces a higher permeate output thereby reducing the reject ratio to a value closer to the desired value. Conversely, a low reject ratio causes a low rotor rotation rate that decreases turbine flow resistance and reduces feed pressure boost. One or both of these characteristics (again depending on the type of feed pump) will result in a lower membrane pressure. A lower membrane pressure automatically increases the reject ratio. The net result is that the power recovery pump turbine 25 automatically regulates the reject ratio regardless of the cause of the reject ratio variation such as feed water temperature changes, feed water salinity changes, membrane compaction or any combination of these causes.

The key to the above self-regulation is that the rotor 55 is free to adjust its speed of rotation to meet changing pressure and flow conditions and is not mechanically linked to external devices such as a motor that could inhibit the automatic adjustment of rotor speed. Another key is that the turbine flow resistance is determined in part by the rotor speed. The only types of turbine that provides this kind of response to rotor speed are radial, mixed flow and axial flow types, generally called reaction turbines. This specifically excludes impulse type turbines such as the "Pelton Wheel". Therefore, the power recovery pump turbine 25 must use specific types of turbines to obtain the maxiumum self-regulating effect. In tests of the power recovery pump turbine in a reverse osmosis desalination system handling feed water with varying salinity, it has been found that the power recovery pump turbine can provide sufficient self-regulation of the reject ratio as to entirely eliminate the need for an operator to regulate the membrane pressure. This is an important consideration in mobile reverse osmosis systems. In summary, the power recovery pump turbine provides a partial regeneration of the feed pressure which means membrane pressure is now partially established by a feedback loop through the power recovery pump turbine involving the reject flow and feed flow rates. This interaction between the membrane and the power recovery pump turbine is the essence of the self-regulation aspect of the power recovery pump turbine.

Figure 12:
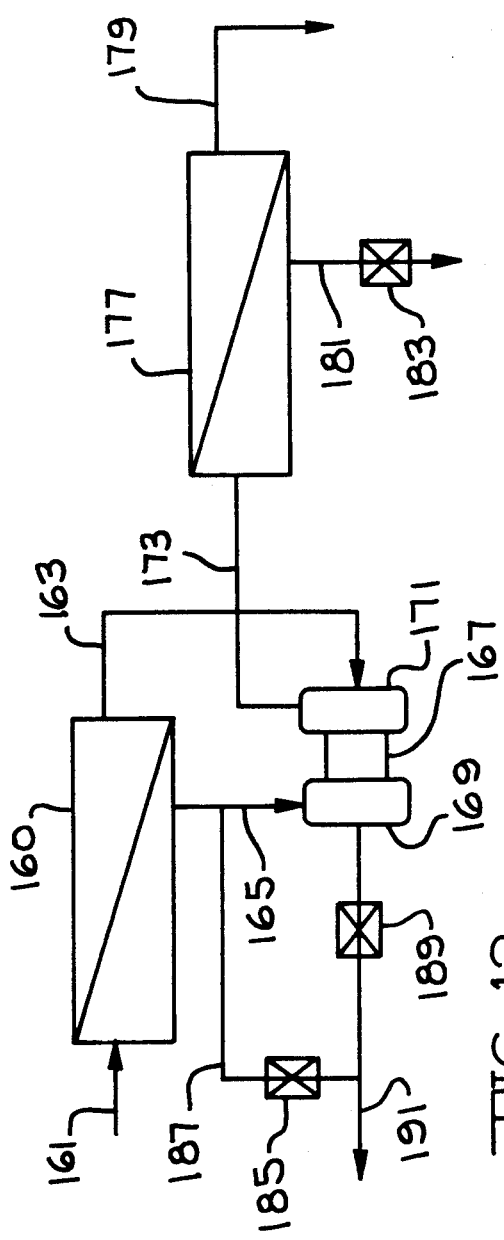
FIG. 12 is a schematic view of a power recovery pump turbine of the present invention used in a two-stage water purification system.

FIG. 12 shows a two-stage reverse osmosis desalination system utilizing a power recovery pump turbine of the present invention. In this system, high pressure feed water enters the first-stage membrane chamber 160 through pipe 161. The high pressure feed water can be supplied to the first-stage membrane chamber 161 as previously described. The purified water is removed from the first-stage membrane chamber 160 through passageway 163. The purified water is at a low pressure in passageway 163. The high pressure brine reject is discharged from the first-stage membrane chamber 160 through pipe 165. The high pressure brine reject is directed to the turbine end 169 of a power recovery pump turbine 167 as previously described. The purified water from the first-stage membrane chamber 160 is directed to the pump end 171 of the power recovery pump turbine 167. The high pressure reject causes the impeller in the turbine end 169 to rotate which in turn causes the impeller in the pump end 171 to rotate. This results in the purified water entering the pump end 171 of the power recovery pump turbine being discharged from the pump end through conduit 173 at an elevated pressure. The pressure boost supplied by the power recovery pump turbine is sufficient to allow the purified water to enter a second-stage membrane chamber 177. The second-stage membrane chamber further purifies the water and the additionally purified water is discharged from the second-stage member chamber 177 through passageway 179. The high pressure reject is discharged from the second-stage membrane chamber through pipe 181 and a pressure regulator valve 183 which reduces the pressure of the reject stream so that the reject can be safely disposed of. The pressure regulator valve 183 also maintains sufficient pressure in the pipe 181 so that there is sufficient pressure in the second-stage membrane chamber 177 to further purify the water.

The power recovery pump turbine 167 must provide adequate pressure boost to the purified water from the first-stage membrane chamber to insure proper purification in the second-stage membrane chamber. The power recovery pump turbine must also regulate the pressure in the first-stage membrane chamber 160 so that there is the required level of pressure in the first-stage membrane chamber 160 to allow the sea water to be purified. The amount of pressure boost generated by the power recovery pump turbine 167 is controlled by varying the reject flow rate through the turbine end 169 of the power recovery pump turbine. This is accomplished by positioning a bypass valve 185 in line 187. Line 187 is positioned to totally bypass the turbine end 169 of the power recovery pump turbine. The bypass valve 185 controls the amount of reject that enters the turbine end 169. As the bypass valve 185 is opened, less and less reject enters the turbine end 169. This reduces the rotation rate of the impeller in the turbine end of the power recovery pump turbine 167 and reduces the boost generated by the impeller in the pump end 171 of the power recovery pump turbine. Accordingly, the pressure of the water supplied to the second-stage membrane chamber 177 can be easily controlled by adjusting the bypass valve 185 in line 187.

A back pressure valve 189 is positioned in the discharge pipe 191 that discharges the reject from the turbine end 169 of the power recovery pump turbine 167. The back pressure valve 189 controls the flow of the reject through the turbine end of the power recovery pump turbine and can be utilized to control the pressure in the pipe 165 and accordingly in the first-stage membrane chamber 160. By adjusting the back pressure valve 189, the proper level of pressure can be maintained in the first-stage membrane chamber 160. It should be noted that utilizing the back pressure valve 189 and the pressure regulator valve 183 allows the pressure in the first-stage and second-stage membrane chambers to be independently controlled to provide for superior flexibility in the production of purified water at each stage.

Although the description has shown a two-stage purification system, it should be realized that additional stages could be added to the system if this is necessary to achieve the desired level of purification for the water.

The same self-regulating effect is provided by the power recovery pump turbine in two-stage systems although the exact method is a little different from the previously described single membrane system. If the reject ratio of the first-stage membrane chamber 160 in FIG. 12 should increase (due to, for example, cold feed water), this causes an increase in the flow and pressure through the turbine end 169. This action increases the feed pressure in the first-stage membrane chamber 160 which reduces the reject ratio to a value closer to normal. At the same time, this high reject ratio increases the boost pressure generated by the pump end 171 which in turn raises the pressure in the second-stage membrane chamber 177. This higher pressure helps to reduce the reject ratio (which would be high as a result of the cold feed water) of the second-stage membrane chamber 177. Therefore, the power recovery pump turbine tends to help regulate the reject ratios for the first-stage and second-stage membrane chambers in a completely automatic manner.

Figure 13:
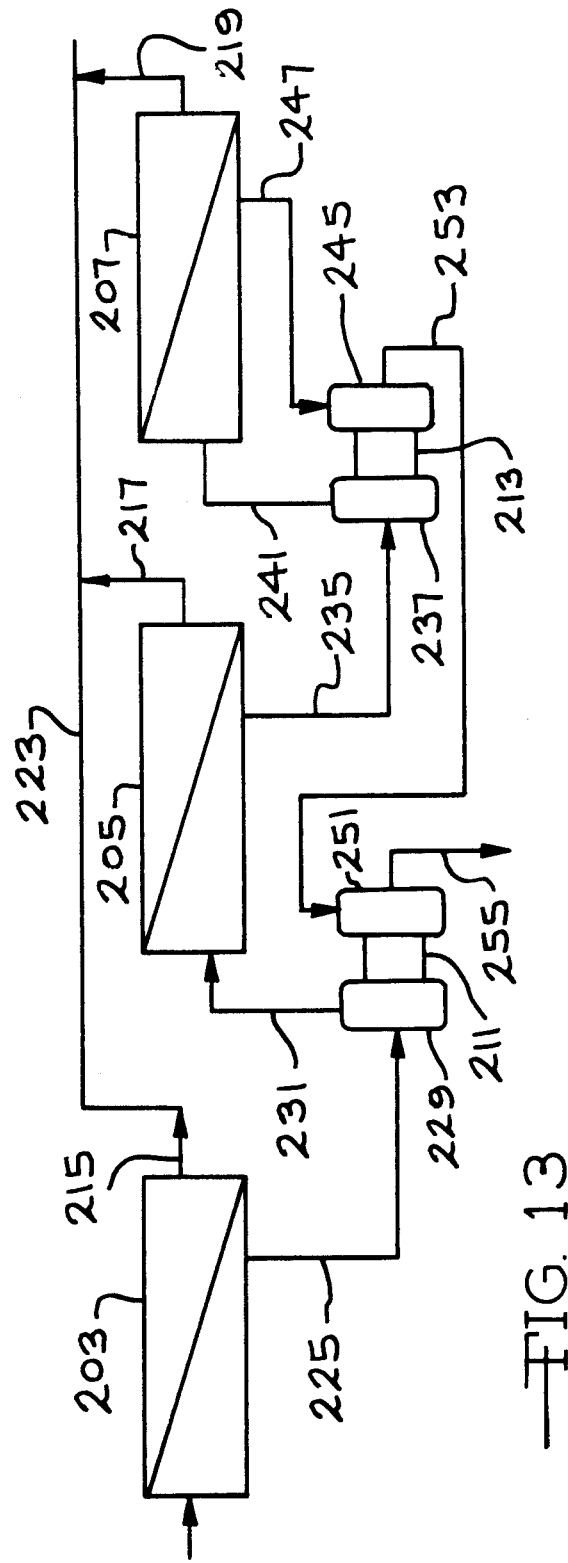
FIG. 13 is a schematic view of a multiple-stage water purification system.

It is also possible to use multiple stage membrane chambers to continue to purify the reject water that is discharged from a multiple membrane chamber. FIG. 13 shows a multiple stage purification system called reject staged where the reject stream from one membrane chamber is further purified in an additional membrane chamber. This system also utilizes the power recovery pump turbine to boost the pressure of the reject stream prior to entering the next purification membrane chamber. As shown in FIG. 13, there is a first-stage membrane chamber 203, a second-stage membrane chamber 205 and a third-stage membrane chamber 207. The first, second and third membrane chambers are constructed in the same manner and function in the same manner as the previously described membrane chambers, however, a first power recovery pump turbine 211 is positioned between the first-stage membrane chamber 203 and the second-stage membrane chamber 205 and a second power recovery pump turbine 213 is positioned between the second-stage membrane chamber 205 and the third-stage membrane chamber 207. The purified water from the first-stage, second-stage and third-stage membrane chambers is discharged through discharge pipes 215, 217 and 219, respectively, and to a common collection header 223.

The reject stream from the first-stage membrane chamber 203 is directed into discharge conduit 225 which directs the reject stream into the pump end 229 of the first power recovery pump turbine 211. The impeller in the pump end of the power recovery pump turbine increases the pressure of the reject stream and delivers it to feed line 231 which is connected to the second-stage membrane chamber 205. Thus, the reject from the first-stage membrane chamber is directed to the second-stage membrane chamber where the reject stream can be further processed and additional purified water removed from the reject through dischage pipe 217. The reject from the second-stage membrane chamber 205 passes through discharge conduit 235 and into the pump end 237 of the second power recovery pump turbine 213. The impeller in the pump end of the second power recovery pump turbine 213 acts to boost the pressure of the reject stream and the reject is directed through feed line 241 into the third-stage membrane chamber 207 where additional purified water can be removed from the reject through discharge pipe 219. The reject from the third-stage membrane chamber is directed to the turbine end 245 of the second power recovery pump turbine 213 by discharge conduit 247. The reject stream drives the impeller in the turbine end 245 of the second power recovery pump turbine 213 which causes the impeller in the pump end 237 to rotate to boost the pressure of the reject that is being fed to the third-stage membrane chamber 207. The reject discharged from the turbine end 245 of the second power recovery pump turbine 213 is directed to the turbine end 251 of the first power recovery pump turbine 211 by pipe 253. The reject from the pipe 253 causes the impeller in the turbine end 251 of the first power recovery pump turbine 211 to rotate which in turn causes the impeller in the pump end 229 to rotate to boost the pressure of the reject supplied to the second-stage membrane chamber 205. The reject is discharged from the turbine end 251 of the first power recovery turbine 211 through conduit 255. A back pressure valve (not shown) can be positioned in the conduit 255 to control the flow of the reject stream through the turbine end 245 of the second power recovery pump turbine 213 in the turbine end 251 of the first power recovery pump turbine 211 to insure that there is sufficient back pressure in the second-stage and third-stage membrane chambers to allow for effective desalination of the sea water. It should be noted that the reject stream from the third-stage membrane chamber 207 could be directed to the turbine end 251 of the first power recovery pump turbine 211 and that the discharge of the turbine end 251 could be piped to the turbine end 245 of the second power recovery pump turbine.

In such a stage system it should be noted that almost any number of stages could be utilized. However, in practice it has been found that from about 2 to about 4 stages or membrane chambers define the practical limits for such a system.

The amount of pressure boost generated by the first and second pumping chambers 263, 265 need not be the same and in some instances should not be the same. The desired amount of pressure boost generated by each pumping chamber can be obtained by selecting the appropriate pump or turbine impeller diameter. Therefore, the impeller diameter of each pumping or turbine chamber can be different to provide for a different amount of pressure boost for each pumping chamber.

Figure 14:
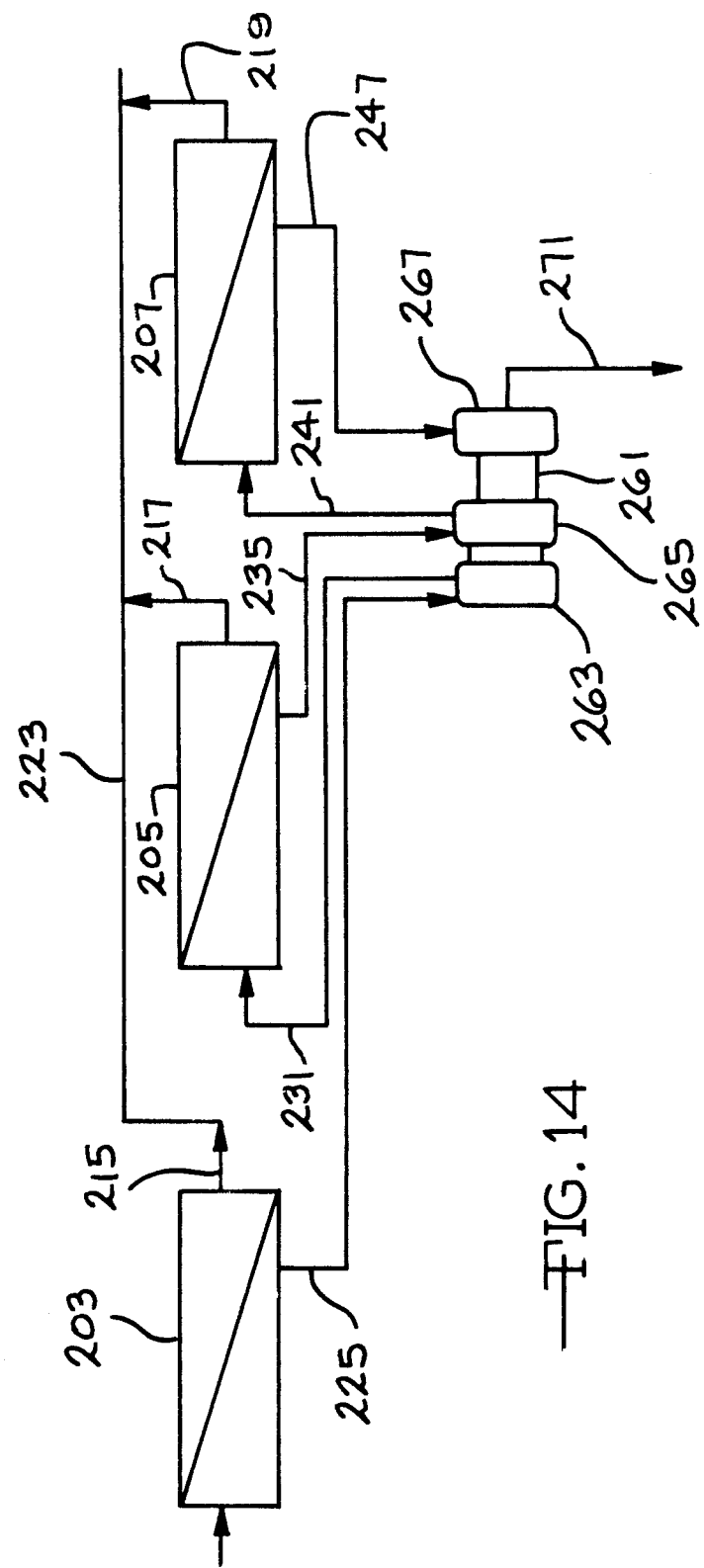
FIG. 14 is another embodiment of a multiple-stage water purification system.

FIG. 14 shows another multiple rejected stage purification system where the reject stream from a membrane chamber is further purified in a succeeding membrane chamber. This system utilizes a first-stage membrane chamber 203, second-stage membrane chamber 205 and a third-stage membrane chamber 207 as shown in FIG. 13. Since the arrangement of the membrane chambers and the plumbing connections for the membrane chambers are essentially the same as previously discussed for FIG. 13, that description will not be repeated here. The difference between the system shown in FIG. 13 and the system of FIG. 14 is that a single power recovery pump turbine 261 is utilized to boost the pressure of the reject stream so that it can be further purified. The power recovery pump turbine 261 has a first pumping chamber 263 and a second pumping chamber 265. The power recovery pump turbine 261 also has a pumping chamber 267 and the impellers in the first and second pumping chambers are mounted on the same shaft as the impeller in the turbine chamber 267. The reject from the first-stage membrane chamber 203 passes through discharge conduit 225 into the first pumping chamber 263 on the power recovery pump turbine 261. The rotation of the impeller in the first pumping chamber boosts the pressure of the reject stream and the reject is discharged from the first pumping chamber 263 through feed line 231 into the second-stage membrane chamber 205. The reject from the second-stage membrane chamber passes through discharge conduit 235 into the second pumping chamber 265 in the power recovery pump turbine 261. The impeller in the second pumping chamber 265 rotates to boost the pressure of the reject stream and the reject stream is discharged through feed line 241 to the third-stage membrane chamber 207. The reject from the third-stage membrane chamber 207 enters discharge conduit 247 and is directed to the turbine chamber 267 of the power recovery pump turbine 261. The reject stream from the third-stage membrane chamber 207 causes the impeller in the turbine chamber 267 to rotate which causes the impellers in the first and second pumping chambers to rotate. The energy in the high pressure reject stream discharged from the third-stage membrane chamber 207 provides the energy to boost the pressure of the reject stream from the first-stage membrane chamber 203 and the second-stage membrane chamber 205 so that these reject streams can be further purified. The reject stream is discharged from the turbine chamber 267 through conduit 271. A back pressure valve (not shown) can be positioned in the conduit 271 to control the flow rate of the reject through the turbine chamber 267 to insure that there is adequate back pressure in the third-stage membrane chamber 207 for the third-stage membrane chamber to effectively purify saltwater. The purified water from the first-stage, second-stage and third-stage membrane chambers is collected in a collection header 223 as previously described.

The use of power recovery pump turbines in the brine staged systems depicted in FIGS. 13 and 14 overcomes a control problem associated with brine staged systems. As the feed water passes through successive stages of purification, the salinity of the feed water increases. Therefore, each successive stage must handle a higher degree of feed water salinity. This means that for maximum effectiveness, each successive membrane chamber must be at a higher pressure than the preceding chamber. Current practice is to use motor driven pumps to provide a pressure boost between the stages. However, such pumps can only provide an essentially fixed pressure boost. If feed water conditions should change or if the membranes should compact, these booster pumps are unable to adjust the pressure boost being provided and may not provide the desired membrane pressure in each stage.

The power recovery pump turbine arrangements depicted in FIGS. 13 and 14 automatically adjust to provide the appropriate amount of pressure boost in response to feed water conditions. Specifically, if the permeate output decreases then the reject flow exiting the last stage increases. This increase reject flow through the turbine end of the power recovery pump turbine increases the reject flow resistance which causes the pressure in all of the preceding membrane chambers to increase. The increased flow resistance combined with the higher feed pressure boost provided by each pump end results in a higher pressure in each membrane chamber thereby increasing permeate output and restoring the reject ratio to a value closer to normal. If the reject ratio should become too low, as might occur if the feed water salintiy decreases, then the power recovery pump turbine reacts in a manner described earlier and reduces the membrane pressures thereby increasing the reject ratio. Therefore, in brine staged reverse osmosis purification systems, power recovery pump turbines driven by the last stage reject flow to generate inter-stage pressure boosts provide automatic regulation of all membrane chamber pressures.

The above description of the invention is given for the sake of explanation. Various modifications and substitutions, other than those cited, can be made without departing from the scope of the invention as defined by the following claims.

We claim:

1. A reverse osmosis water purification system comprising:

a feed pump supply high pressure water to be purified;

a first purification membrane chamber having an inlet for receiving said high pressure water from said feed pump, an outlet for water purified in said first membrane and a discharge opening for the high pressure reject of unpurified water discharged from said first membrane chamber;

means for recovering energy from at least one purification membrane chamber for application in at least another purification membrane chamber including a power recovery pump turbine positioned adjacent said first membrane chamber, said power recovery pump turbine having a turbine end and a pump end, an impeller positioned turbine and pump ends of said power recovery pump turbine, said turbine impeller and said pump impeller being mounted on a common shaft, said turbine end having an inlet opening for receiving said high pressure reject from said first membrane, said high pressure reject causing said turbine impeller to rotate, said pump impeller mounted on said common shaft being caused to rotate by said rotation of said turbine impeller, said pump end having an inlet opening for receiving said purified water from said first membrane chamber and a discharge opening, the pressure of said purified water being increased by the rotation of said pump impeller so that the purified water discharged from said pump end of said power recover pump turbine is at an elevated pressure sufficient to allow a purification membrane chamber to further purify said water, and a second purification membrane chamber having an inlet for receiving said water from said discharge opening of said pump end of said power recovery pump turbine, an outlet for water further purified in said second membrane chamber and a discharge opening for the reject of unpurified water discharge from said second membrane chamber, said pump end of said power recovery pump turbine increasing the pressure of said water discharged from said outlet of said first membrane to allow said water to be purified in said second membrane.

2. The water purification system of claim 1, wherein said turbine impeller and pump impeller can be of different sizes to provide the desired amount of pressure to said water supplied to said second membrane chamber.

3. The water purification system of claim 1, wherein a bypass valve is positioned between said first membrane chamber and said power recovery pump turbine, said bypass valve being positioned to be able to divert at least a portion of said high pressure reject discharged from said first membrane chamber from said turbine of said power recovery pump turbine to control the amount of pressure increase supplied by said pump end of said power recovery pump to said water supplied to said second membrane chamber.

4. The water purification system of claim 1, wherein a back pressure valve is positioned on the discharge for said turbine end of said power recovery pump turbine, sand back pressure valve controlling the flow of said unpurified water through said turbine end of said power recovery pump turbine to control the pressure in said first membrane chamber.

5. The water purification system of claim 1, wherein a pressure regulator valve is operatively connected to said discharge opening for said second membrane chamber, said pressure regulator valve controlling said flow of unpurified reject from said second membrane chamber to control the pressure in said second membrane chamber.

6. The water purification system of claim 1, wherein said power recovery turbine automatically varies the pressure in said first and second membrane chambers when changes in said water purification system occur, said discharge of unpurified water from said first membrane chamber changes when the pressure in said first membrane chamber changes, said change in said discharge of unpurified water changing the rotation rate of said turbine impeller and the back pressure supplied by said turbine end of said power recovery pump turbine to said first membrane chamber and the rotation rate of said impeller in said pump end to change the pressure boost provided to said water supplied to said second membrane chamber whereby said pressure in said first and second membrane chambers is automatically controlled by said power recovery pump turbine.

7. A method for purifying water comprising:

supplying high pressure water to a first membrane chamber to purify a portion of said water, said membrane chamber having an inlet for receiving said high pressure water, an outlet for purified water and a discharge opening for high pressure reject of unpurified water;

recovering energy from at least one purification membrane chamber for application in at least another purification membrane chamber including directing said high pressure reject to the turbine end of a power recovery pump turbine; said power recovery pump turbine having a turbine end and a pump end, an impeller being positioned in said pump end and said turbine end, said pump and turbine impellers being mounted on a common shaft and being freely rotatable, said high pressure reject causing said impeller in said turbine end to rotate which causes said impeller in said pump end to rotate;

directing said purified water from said first membrane chamber to said pump end of said power recovery pump turbine;

increasing the pressure of said purified water from said first membrane chamber by the rotation of said impeller in said pump end;

directing said water from said pump end of said power recovery pump turbine to a second membrane to further purify said water.

8. The method of claim 7 in which a bypass valve is positioned between said first membrane chamber and said power recovery pump turbine, said bypass valve controlling the portion of said high pressure reject from said first membrane chamber that is supplied to said turbine end of said power recovery pump turbine to control the rotation rate of said turbine and pump impellers to control the pressure increase supplied by said pump end to said water directed to said second membrane chamber.

9. The method of claim 7 in which a back pressure valve is positioned on the discharge for said turbine end of said power recovery pump turbine to control the flow of unpurified water through said turbine end, said back pressure valve controlling said pressure in said first membrane chamber.

10. A reverse osmosis water purification system comprising:

a plurality of purification membrane chambers positioned in series, said membrane chambers having an inlet for receiving water at high pressure to be purified, an outlet for said water purified in said membrane chambers and a discharge opening for the high pressure unpurified water discharged from said membrane chambers;

means for recovering energy from at least one purification membrane chamber for application in at least another purification membrane chamber including a plurality of power recovery pump turbines positioned in series adjacent said membrane chambers, said power recovery pump turbines having a turbine end and a pump end, said turbine end having an impeller and said pump end having an impeller, said turbine impeller and pump impeller being mounted on a common shaft, said turbine end having an inlet opening and a discharge opening, said pump end having an inlet opening and a discharge opening, said high pressure unpurified water from said last membrane chamber in said series being directed to said inlet opening on said turbine end of said power recovery pump turbines to cause said impeller in said turbine end and said impeller in said pump end of said power recovery pump turbines to rotate, said unpurified water from said other purification membrane chambers in said series being supplied to said pump end of said power recovery pump turbines, said rotation of said impeller in said pump end causing said pressure of said unpurified water to increase and said unpurified water is directed to said next purification membrane chamber in said series to further purify said water.

11. The water purification system of claim 10, wherein said pump and turbine impellers in said power recovery pump turbines are freely rotatable.

12. The water purification system of claim 10, wherein said size of said pump and turbine impellers in said power recovery pump turbines can vary to provide the desired level of pressure increase for each membrane chamber.

13. The water purification system of claim 10, wherein there is from about 2 to about 4 membrane chambers in said system.

14. A method for purifying saltwater comprising:
supplying high pressure saltwater to a first of a plurality of membrane chambers positioned in series, said membrane chambers having an inlet for high pressure saltwater to be purified, an outlet and a discharge opening;
purifying a portion of said saltwater in said first membrane chamber;
discharging said purified water from said outlet of said first membrane chamber;
discharging said high pressure reject of unpurified water from said discharge opening of said first membrane chamber;
recovering energy from at least one purification membrane chamber for application in at least another purification membrane chamber including directing said high pressure reject from said last membrane chamber to the turbine side of a plurality of power recovery pump turbines, said power recovery pump turbines having a turbine side and pump side, an impeller being positioned in said turbine and pump sides and said impellers being mounted on a common freely rotatable shaft;
causing said turbine and pump impellers in said power recovery pump turbines to rotate due to the passing of said high pressure reject of unpurified water from said last membrane chamber through said turbine side of said power recovery pump turbines, there being one less power recovery pump turbine than the number of membrane chambers;
directing said high pressure reject of unpurified water from said other membrane chambers in said series to a pump end on one of said power recovery pump turbines;

increasing said pressure of said high pressure reject of unpurified water by the rotation of said impeller in said pump end of said power recovery pump turbine;
supplying said unpurified water from said pump end of said power recovery pump turbine to said next membrane chamber in said series to purify a portion of said water; and
collecting said purified water from said membrane chambers.

15. A reverse osmosis water purification system comprising:
a plurality of purification membrane chambers positioned in series, said membrane chambers having an inlet for receiving water at high pressure to be purified, an outlet for said water purified in said membrane chambers and a discharge opening for the high pressure unpurified water discharged from said membrane chambers;
means for recovering energy from at least one purification membrane chamber for application in at least another purification membrane chamber including a power recovery pump turbine positioned adjacent said membrane chambers, said power recovery pump turbine having a turbine end and a pump end with a plurality of pumping cavities, the number of such pumping cavities being one less than the number of membrane chambers, said turbine end having an impeller and said pump end having an impeller in each pump cavity, said turbine impeller and pump impellers being mounted on a common shaft, said turbine end having an inlet opening and a discharge opening, said pump end having an inlet opening and a discharge opening for each pump cavity, said high pressure unpurified water from said last membrane chamber in said series being directed to said inlet opening on said turbine end of said power recovery pump turbine to cause said impeller in said turbine end and said impellers in said pump end of said power recovery pump turbine to rotate, said unpurified water from said other purification membrane chambers in said series being supplied to one of said pumping cavities on said pump end of said power recovery pump turbines, said rotation of said impeller in said pump end causing said pressure of said unpurified water to increase and said unpurified water is directed to said next purification membrane chamber in said series for purification.

16. The water purification system of claim 15, wherein said pump and turbine impellers in said power recovery pump turbine are freely rotatable.

17. The water purification system of claim 15, wherein said size of said pump and turbine impellers in said power recovery pump turbine can vary to provide the desired level of pressure increase for each membrane chamber.

18. The water purification system of claim 15, wherein there are from about 2 to about 4 membrane chambers in said system.

19. A method for purifying saltwater comprising:
supplying high pressure saltwater to a plurality of membrane chambers positioned in series, said membrane chambers having an inlet for said high pressure saltwater, an outlet for purified water and a discharge opening for unpurified reject water discharged from said membrane chamber;

recovering energy from at least one purification membrane chamber for application in at least another purification membrane chamber including directing said high pressure reject water from said last membrane chamber in said series to the turbine side of a power recovery pump turbine, said power recovery pump turbine having a turbine side and a pump side, said pump side having a plurality of pumping chambers, there being one less pumping chamber than the number of membrane chambers in said series, an impeller being positioned in said turbine side and in each pumping chamber on said pump side, said impellers being mounted on a common freely rotatable shaft;

causing said turbine and pump impellers to rotate due to the passing of said high pressure reject water through said turbine side of said power recovery pump turbine;

directing said high pressure reject water from said other membrane chamber in said series to one of said pump chambers on said pump end of said power recovery pump turbine;

increasing said pressure of said high pressure reject water by the rotation of said impellers in said pump chambers on said pump end of said power recovery pump turbine;

supplying said unpurified reject water from said pump chambers to said next membrane chamber in said series to purify a portion of said water, said unpurified portion of said water being discharged from said discharge opening of said membrane chamber.

* * * * *